(12) United States Patent
Hsiang et al.

(10) Patent No.: US 10,652,555 B2
(45) Date of Patent: *May 12, 2020

(54) METHOD AND APPARATUS OF PALETTE INDEX MAP CODING FOR SCREEN CONTENT CODING

(71) Applicant: MEDIATEK INC., Hsin-Chu (TW)

(72) Inventors: Shih-Ta Hsiang, New Taipei (TW); Tzu-Der Chuang, Zhubei (TW); Yu-Wen Huang, Taipei (TW)

(73) Assignee: MEDIATEK INC., Hsin-Chu (TW)

(*) Notice: Subject to any disclaimer, the term of this patent is extended or adjusted under 35 U.S.C. 154(b) by 0 days.

This patent is subject to a terminal disclaimer.

(21) Appl. No.: 16/414,992

(22) Filed: May 17, 2019

(65) Prior Publication Data

US 2019/0273930 A1 Sep. 5, 2019

Related U.S. Application Data

(62) Division of application No. 15/764,346, filed as application No. PCT/CN2016/101040 on Sep. 30, 2016, now Pat. No. 10,356,427.

(Continued)

(51) Int. Cl.
| | |
|---|---|
| H04N 19/186 | (2014.01) |
| H04N 19/91 | (2014.01) |
| H04N 19/70 | (2014.01) |
| H04N 19/593 | (2014.01) |
| G06T 9/00 | (2006.01) |
| H04N 19/182 | (2014.01) |
| H04N 19/176 | (2014.01) |

(52) U.S. Cl.
CPC ........... *H04N 19/186* (2014.11); *G06T 9/00* (2013.01); *H04N 19/182* (2014.11); *H04N 19/593* (2014.11); *H04N 19/70* (2014.11); *H04N 19/91* (2014.11); *H04N 19/176* (2014.11)

(58) Field of Classification Search
CPC .................................................... H04N 19/186
USPC ........................................ 375/240.01–240.29
See application file for complete search history.

(56) References Cited

U.S. PATENT DOCUMENTS

| | | |
|---|---|---|
| 2013/0301738 A1 | 11/2013 | Kim et al. |
| 2015/0030066 A1 | 1/2015 | Xu et al. |
| 2015/0264348 A1 | 9/2015 | Zou et al. |

OTHER PUBLICATIONS

International Search Report dated Dec. 26, 2016 issued in application No. PCT/CN2016/101040.

(Continued)

*Primary Examiner* — James M Anderson, II
(74) *Attorney, Agent, or Firm* — McClure, Qualey & Rodack, LLP (57) ABSTRACT

A method and apparatus for video coding using coding modes including a palette mode are disclosed. In one embodiment, the total number of palette indices in the current block is coded into a binary string using a TR (Truncated Rice) binarization process with the Rice parameter to generate a prefix part and using an EGk (k-th order Exp-Golomb) binary process to generate a suffix part for the binary string, or using the EGk binarization process with the Rice parameter (k). The suffix part is allowed to be empty. In another embodiment, a Rice parameter is determined. If the Rice parameter is equal to or greater than log-base-2 of current block size, the variable related to a total number of palette indices in the current block of video data is binarized into a binary string using a fixed-length code with bit length equal to log-base-2 of current block size.

14 Claims, 7 Drawing Sheets

Related U.S. Application Data (60) Provisional application No. 62/238,458, filed on Oct. 7, 2015, provisional application No. 62/237,273, filed on Oct. 5, 2015.

(56) References Cited

OTHER PUBLICATIONS

Joshi, R., et al.; "High Efficiency Video Coding (HEVC) Screen Content Coding: Draft 4;" Joint Collaborative Team on Video Coding (JCT-VC) of ITU-T SG 16 WP 3 and ISO/IEC JTC 1/SC 20/WG 11; Jun. 2015; pp. 1-663.
Joint Collaborative Team on Video Coding (JCT-VC) High Efficiency Video Coding (HEVC) Screen Content Coding: Draft4 JCTVC-U1005-v2 Jun. 26, 2015 (Jun. 26, 2015) pp. 131-02, 139-140, 217-218,222-223.
Hsiang, S.T., et al.; "Further redundancy removal for coding palette index map, XP030117720;" Joint Collaborative Team on Video Coding (JCT-VC) of ITU-T SG 16 WP 3 and ISO/IEC JTC 1/SC 29/WG 11; Oct. 2015; pp. 1-4.
Hsiang, S.T., et al.; "Further redundancy removal for coding palette index map, XP 030117719;" Joint Collaborative Team on Video Coding (JCT-VC) of ITU-T SG 16 WP 3 and ISO/IEC JTC 1/SC 29/WG 11; Oct. 2015; pp. 1-4.
Sullivan, G., et al.; "Meeting Report of 22nd JCT-VC Meeting;" Joint Collaborative Team on Video Coding (JCT-VC) of ITU-T SG 16 WP 3 and ISO/IEC JTC 1/SC 29/WG 11; Oct. 2015; pp. 1-84.
Zou, F., et al.; "Non-CE1: Joint proposal of JCTVC-U0169 and JCTVC-U0090 Item 3;" oint Collaborative Team on Video Coding (JCT-VC) of ITU-T SG 16 WP 3 and ISO/IEC JTC 1/SC 29/WG 11; Jun. 2015; pp. 1-4.

METHOD AND APPARATUS OF PALETTE INDEX MAP CODING FOR SCREEN CONTENT CODING

CROSS REFERENCE TO RELATED APPLICATIONS

The present invention is a Divisional of pending U.S. patent application Ser. No. 15/764,346, filed on Mar. 29, 2018, which is a 371 of PCT Application Serial No. PCT/CN2016/101040, filed on Sep. 30, 2016, which claims priority to U.S. Provisional Patent Application, Ser. No. 62/237,273, filed on Oct. 5, 2015 and U.S. Provisional Patent Application, Ser. No. 62/238,458, filed on Oct. 7, 2015. The U.S. Provisional patent applications are hereby incorporated by reference in their entireties.

TECHNICAL FIELD

The present invention relates to entropy coding for syntax related to video coding. In particular, the present invention relates to techniques to binarization of syntax related to palette index map using a variable-length prefix part and a suffix part.

BACKGROUND

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

In contrast to the conventional natural video with a continuous colour tone, screen content video often contains a few pilot colours and sharp edges and boundaries. Several new tools are currently under investigation for potential adoption into the HEVC SCC (Screen Content Coding) extension. For example, in JCTVC-R-1005 (Joshi, et al., *High Efficiency Video Coding (HEVC) Screen Content Coding: Draft* 1, Joint Collaborative Team on Video Coding (JCT-VC) of ITU-T SG 16 WP 3 and ISO/IEC JTC 1/SC 29/WG 11, 18th Meeting: Sapporo, JP, 30 Jun.-9 Jul. 2014, Document: JCTVC-R1005), a palette is utilized to represent a given video block (e.g. CU) with limited number of values. Some related terms are illustrated as follows.
1. Palette table: A mapping table to map from a pixel value to an index. The palette table is also referred as palette in this disclosure.
2. Colour index map: Mapped pixel indices associated with values in the block. The colour index map is also referred as palette indices of the block.

For HEVC SCC, both the palette and the colour index map have to be signalled. For example, decoding and parsing processes have been disclosed in JCTVC-R0348 (Onno, et al, "*Suggested combined software and text for run-based palette mode*", Joint Collaborative Team on Video Coding (JCT-VC) of ITU-T SG 16 WP 3 and ISO/IEC JTC 1/SC 29/WG 11, 18th Meeting: Sapporo, JP, 30 Jun.-9 Jul. 2014, Document: JCTVC-R0348). For the colour index map signalling, the pixels in the block can be coded in horizontal raster scan order, vertical raster order, horizontal traverse scan order or vertical traverse order. Various palette index prediction modes, such "copy above mode", "index mode", "Escape mode", etc. can be used. In addition, the number of palette indices in each block is also signalled.

In the draft HEVC SCC standard disclosed in JCTVC-U1005 (Joshi, et al., *HEVC Screen Content Coding Draft Text* 3, Joint Collaborative Team on Video Coding (JCT-VC) of ITU-T SG 16 WP 3 and ISO/IEC JTC 1/SC 29/WG 11, 20th Meeting: Geneva, CH, 10-18 Feb. 2015, Document: JCTVC-T1005), binarization method for the number of indices is disclosed. In JCTVC-U1005, the number of indices minus 1 (i.e., num_palette_indices_minus1) is first signalled. The prefix part is coded using Truncated Rice (TR) code. The suffix part is coded using kth-order Exp-Golomb (EGk) code. The Truncated Rice binarization process uses parameter, cRiceParam, to derive the prefix part. In particular, when num_palette_indices_minus1<(3<<k), the TR code is used and k is the Rice parameter. Otherwise, EGk code is used with preceding "111". The "<<" in the above equation corresponds to the left-shift operation.

The Rice parameter cRiceParam (i.e., k) is derived as:

$$cRiceParam=3+((MaxPaletteIndex+1)>>3), \quad (1)$$

according to JCTVC-U1005, where ">>" corresponds to the right-shift operation.

Some examples of TR and EGk binarization processes are shown as follows. Table 1 illustrates an example with cRiceParam(k)=0 with 0th-order EG (i.e., EG0) and Table 2 illustrates an example with cRiceParam(k)=2 with 2nd-order EG (i.e., EG2):

TABLE 1

| k = 0 | Prefix | Suffix (EG0 code) |
|---|---|---|
| 0 | 0 | |
| 1 | 10 | |
| 2 | 110 | |
| 3 | 111 | 0 |
| 4~5 | 111 | 10X |
| 6~9 | 111 | 110XX |
| ... | ... | ... |

TABLE 2

| k = 2 | Prefix | Suffix (EG2 code) |
|---|---|---|
| 0~3 | 0 | XX |
| 4~7 | 10 | XX |
| 8~11 | 110 | XX |
| 12~15 | 111 | 0XX |
| 16~23 | 111 | 10XXX |
| 24~39 | 111 | 110XXXX |
| ... | ... | ... |

According to the existing HEVC SCC draft (i.e., JCTVC-U1005), the cRiceParam may be very large. For example, the maximum cRiceParam can be 11, 19, 35, and 131 for palette size equal to 63, 127, 255, 1024 (i.e., 32×32) respectively. In other words, the worst-case number of the coded bins equal to 132 (i.e., cRiceParam+1) for a 32×32 CU, which is extremely long. There are redundant bits present in the case of large cRiceParam. If the fixed-length (FL) code is used, there will be no more than Log 2CUSize bins using FL binarization, where Log 2CUSize=$\log_2$(CU size). Therefore, only 6, 8 and 10 bins will be needed for 8×8, 16×16, and 32×32 CUs respectively. According to the existing HEVC SCC draft, cRiceParam determines the minimal length of the FL suffix part. Therefore, when cRiceParam is greater than or equal to Log 2CUSize, the prefix is always equal to 0 and some redundant leading 0 bins are present. For example, 6 redundant "0" bins will be present in the binarization of the number of palette indices minus one (i.e., syntax num_palette_indices_minus1) for 8×8 CU with palette size equal to 63.

Therefore, it is desirable to improve the coding efficiency associated with colour index map coding.

SUMMARY

A method and apparatus for video coding using coding modes including a palette mode are disclosed. According to one embodiment of the present invention, the total number of palette indices in the current block of video data is coded into a binary string using a TR (Truncated Rice) binarization process with input information including the Rice parameter to generate a prefix part of the binary string and using an EGk (k-th order Exp-Golomb) binary process to generate a suffix part of the binary string, or binarizing the variable into a binary string using the EGk binarization process with input information including the Rice parameter (k). The suffix part is allowed to be empty and k is a non-negative integer. The block may correspond to a coding unit (CU). The suffix part can be generated using a kth-order Exponential Golomb (EGk) code.

In one example, the Rice parameter, cRiceParam, for the current block of the video data is derived according to cRiceParam=(a*(log 2(CUSize)>>1)+n+((MaxPaletteIndex+c)>>m)), where log 2( ) is a log-base-2 function, CUSize corresponds to the block size of the current block of the video data, MaxPaletteIndex specifies a maximum possible value for any palette index in the current block of the video data, a is a non-zero integer, and n, c and m are integers. In another example, the Rice parameter, cRiceParam, for the current block of the video data is derived according to cRiceParam=(a*(log 2(CUSize)>>1)+Floor (Log 2(MaxPaletteIndex+1))+1+n).

In another embodiment, the coding system determines a Rice parameter. If the Rice parameter is equal to or greater than log-base-2 of current block size, the variable related to a total number of palette indices in the current block of the video data is binarized into a binary string using a fixed-length (FL) code with bit length equal to the log-base-2 of current block size. If the Rice parameter is smaller than the log-base-2 of current block size, the variable is binarized into the binary string comprising a prefix part and a suffix part, where the prefix part is generated using a TR (Truncated Rice) binarization process with input information including the Rice parameter, and the suffix part is generated using another binarization process, and the suffix part is allowed to be empty. The Rice parameter in this embodiment can also be derived depending on the block size of the current block.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
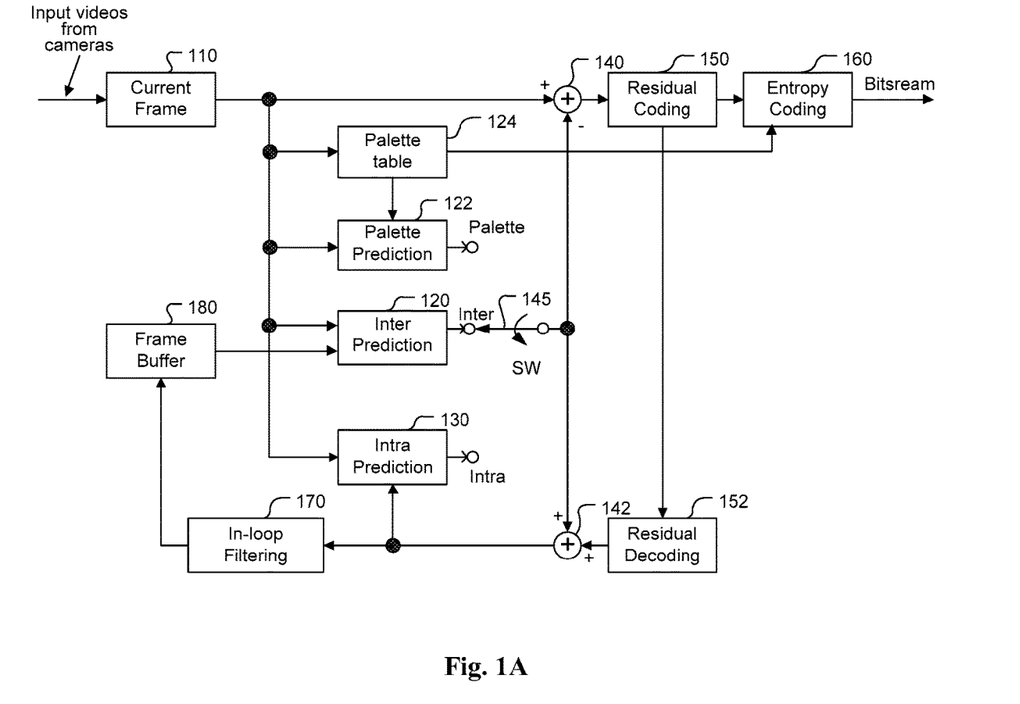
FIG. 1A illustrates an exemplary block diagram for a video encoder incorporating Palette, Inter and Intra prediction.

As mentioned before, palette coding mode can be used in a video coding system that may incorporate Inter prediction and Intra prediction modes. FIG. 1A illustrates an exemplary video encoder according to existing advanced video coding standards such as High Efficiency Video Coding (HEVC), which utilizes adaptive Palette Prediction 122, Inter Prediction 120 and Intra Prediction 130. For Palette Prediction mode, input pixels are converted to palette indices using a Palette table 124 and the palette indices are then coded using Palette prediction 122. Information related to the Palette table 124 is signalled in the bitstream using Entropy Coding 160. The Inter Prediction 120 supports the conventional Inter-prediction mode 122 that utilizes motion estimation (ME) and motion compensation (MC) to generate temporal prediction for a current frame 110 based on previous reconstructed picture or pictures. The previous reconstructed pictures, also referred as reference pictures, are stored in the Frame Buffer 180. A switch 145 is used to select among the Palette Prediction 122, the Inter Prediction 120 and the Intra Prediction 130. The selected prediction is subtracted from the corresponding signal of the current frame to generate prediction residuals using an Adder 140. The prediction residuals are processed using Residual Coding 150 followed by Entropy Coding 160 to generate video bitstream. Transform and Quantization are often used for residual coding. Since reconstructed pictures are also required in the encoder side to form reference pictures. Accordingly, residual decoding 152 are also used to generate reconstructed prediction residuals. Inverse Quantization and Inverse Transform (Inv. Trans./Inv. Quan.) are used to match the Transform and Quantization used in the encoding path. The reconstructed residuals are then added with the prediction selected by the Switch 145 to form reconstructed video data associated with the current frame. In-loop Filtering 170 such as deblocking filter and Sample Adaptive offset (SAO) are often used to reduce coding artifacts due to compression before the reconstructed video is stored in the Frame Buffer 180.

Figure 1B:
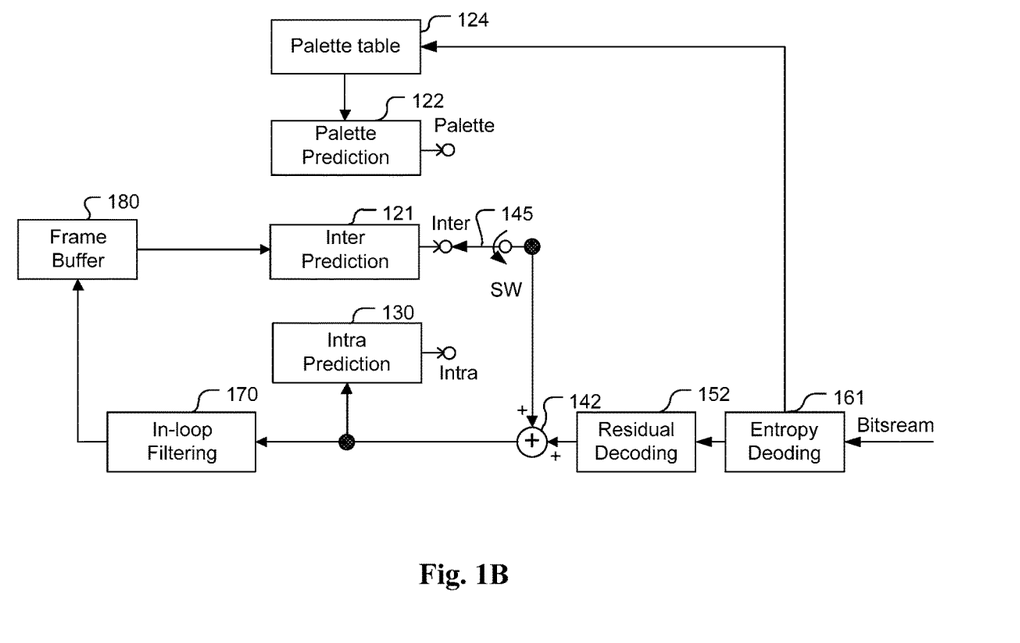
FIG. 1B illustrates an exemplary block diagram for a video decoder incorporating Palette, Inter and Intra prediction.

A video decoder as shown in FIG. 1B corresponding to the encoder in FIG. 1A can be formed similar to the reconstruction loop used by the encoder. However, an entropy decoder 161 will be required instead of an entropy encoder. Furthermore, only motion compensation is required for Inter prediction 121 since the motion vectors can be derived from the video bitstream. For the Palette Prediction mode, the Palette table is recovered from the bitstream using Entropy Decoding 161. The Palette table 124 is then provided to the Palette Prediction 122 to reconstruct the pixel values in a block. As is understood, the Palette Prediction 122 in the decoder side performs the reverse processing of Palette Prediction in the encoder side.

The palette coding mode usually is processed by dividing the image into blocks and coding is applied to each block. Furthermore, Intra or Inter prediction may also be used jointly with palette coding mode. For example, the palette indices in a block (e.g. coding unit, CU) may be Intra coded using reconstructed neighbouring pixels or indices. The palette indices may also be predicted by previous reconstructed palette indices in the same block. For example, various palette index coding modes such as "index run", "copy above", "Escape", etc. are supported in JCTVC-U1005 draft standard.

Figure 2A:
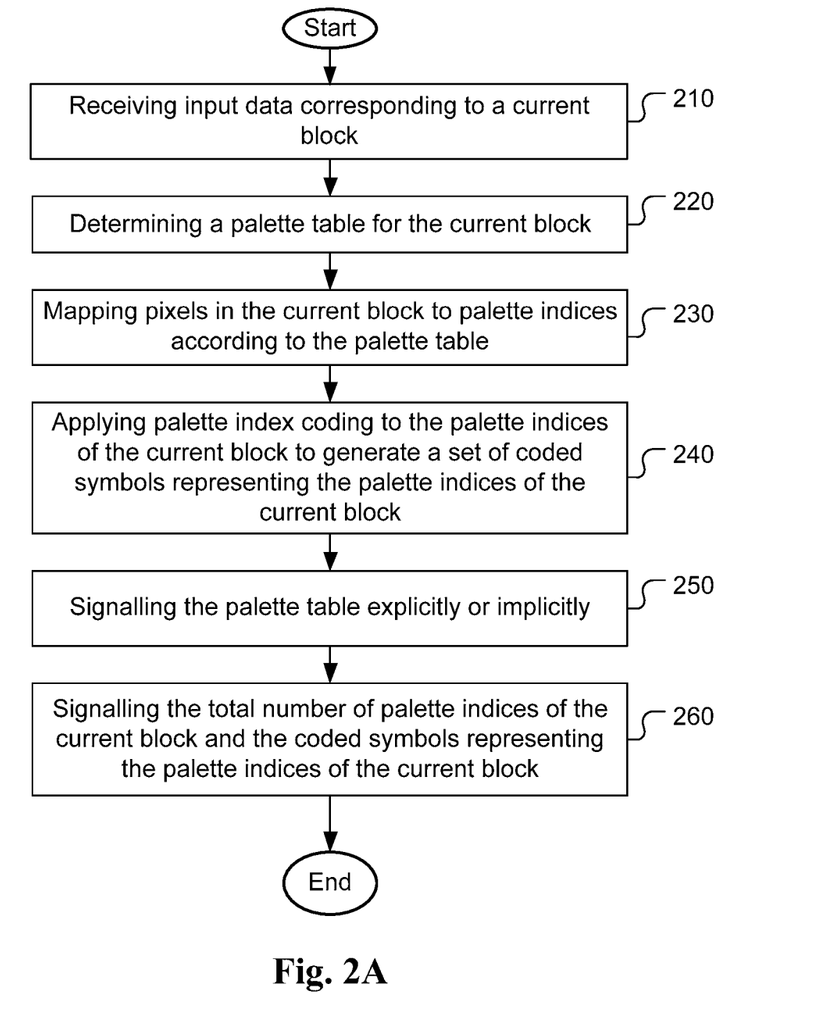
FIG. 2A illustrates an exemplary flowchart for a video encoder to encode a block in palette coding mode.

In palette coding, each pixel value for each pixel is mapped to a palette index. For pixel values not in the palette, an escape mode may be signalled using an escape code along with the pixel value. The palette (also called palette table) has to be signalled so that the decoder can reconstruct the pixel values from palette indices. Therefore, the palette table has to be explicitly signalled or derived implicitly at the decoder side. FIG. 2A illustrates an exemplary flowchart for encoding a block using the palette coding mode. The encoder receives input data corresponding to a current block in step 210. The encoder determines a palette for the current block in step 220. Methods for determining the palette table is known in the literature. Pixels in the current block are mapped to palette indices according to the palette table in step 230. Palette index coding is then applied to the palette indices of the current block to generate a set of coded symbols representing the palette indices of the current block in step 240. The palette table is signalled explicitly or implicitly in step 250. Since the palette table bears some similarity from block to block, the palette table often is signalled by updating a previous palette table. Palette table coding is also known in the literature. The total number of palette indices of the current block and the coded symbols representing the palette indices of the current block are signalled in step 260. As known in the field, the total number of palette indices of the current block and the coded symbols representing the palette indices of the current block are often entropy coded to generate a bitstream for the current block.

Figure 2B:
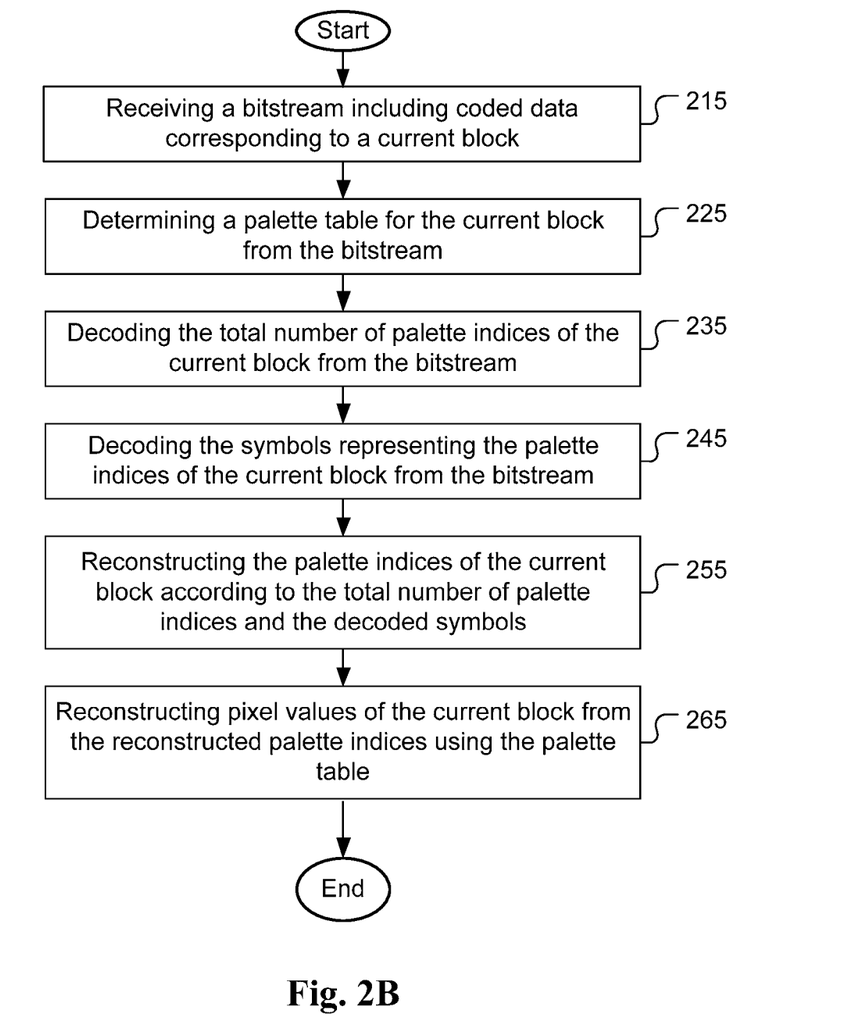
FIG. 2B illustrates an exemplary flowchart for a video decoder to decode a block in palette coding mode.

FIG. 2B illustrates an exemplary flowchart for decoding a block using the palette coding mode. The palette decoding process performs the inverse process corresponding to the encoding process described in FIG. 2A. The decoder receives a bitstream including coded data corresponding to a current block in step 215. The decoder determines a palette table for the current block from the bitstream in step 225. The total number of palette indices of the current block is decoded from the bitstream in step 235. The symbols representing the palette indices of the current block are decoded from the bitstream in step 245. The palette indices of the current block are reconstructed according to the total number of palette indices and the decoded symbols in step 255. Pixel values of the current block are reconstructed from the reconstructed palette indices using the palette table in step 265.

The flowcharts in FIG. 2A and FIG. 2B are intended to illustrate general palette coding mode and the involvement of coding the total number of the palette indices for the current block. The present invention is related to the binarization process for the total number of palette indices.

As mentioned previously, the binarization process for signalling the variable num_palette_indices_minus1 uses a prefix part and a suffix part. The number of suffix bits may contain some redundant bits so that the suffix part may become very long. Accordingly, the present invention discloses new methods for coding the number of palette indices in the current CU (i.e., num_palette_indices_minus1 as defined in JCTVC-U1005) by signalling explicitly or inferring implicitly. The disclosed methods exploit the fact that the maximal number of palette indices in the current CU is not greater than the total number of pixels in the current CU. Therefore, no more than log 2CUSize bits will be needed to represent the syntax representing the number of palette indices minus one using a fixed length (FL) code, where variable log 2CUSize is equal to the value of $\log_2(\text{CUSize})$ and CUSize represents the CU size.

The present invention is further motivated by the observation that the source symbol (e.g., num_palette_indices_minus1) statistics often vary along with the CU block size. Therefore, the proposed method for selection of the codeword parameter is adaptive with the CU block size.

In one embodiment, the binarization process for coding the syntax element num_palette_indices_minus1 utilizes the k-th order Exp-Golomb binarization process or a concatenation of the truncated Rice (TR) binarization process and the k-th order Exp-Golomb binarization process, as specified in JCTVC-U1005 with a pre-defined method for deriving the binarization parameter k. In one embodiment, the binarization parameter k is adaptive with the current coding unit size, derived by $$k = a*(\log 2(\text{CUSize}) \gg 1) + n + ((\text{MaxPaletteIndex} + c) \gg m), \quad (2)$$

where the variable MaxPaletteIndex specifies the maximum possible value for a palette index of the current coding unit, and a, n, c and m are pre-defined constants.

In one embodiment of the present application, the parameter k can be derived with a=1, n=0, c=1 and m=5. In this case, the binarization process uses the current binarization method specified in Section 9.3.3.14 of JCTVC-U1005 if k≤log 2CUSize and uses the fixed-length binarization with the bit length equal to log 2CUSize, otherwise.

In another embodiment, the binarization parameter is dependent on the most significant bit index of (MaxPaletteIndex+1), derived by $$k = \text{Floor}(\text{Log 2}(\text{MaxPaletteIndex}+1))+1+n \quad (3)$$

or $$k = (\log 2(\text{CUSize}) \gg 1) + \text{Floor}(\text{Log 2}(\text{MaxPaletteIndex}+1))+1+n. \quad (4)$$

In yet another embodiment, the parameter k is set equal to log 2CUSize if the derived parameter k is greater than log 2CUSize.

In yet another embodiment, the proposed variable-length binarization process is applied only if the derived parameter k is less than log 2CUsize. Otherwise, the fixed-length binarization process with the bit length equal to log 2CUSize is used.

In another example, the parameter k is derived according to eq (2) with a=1, n=0, c=1 and m=3. If the parameter k is less log 2CUsize, a concatenation of the truncated Rice binarization process and the k-th order Exp-Golomb binarization process is used. Otherwise, the fixed-length binarization process with the bit length equal to log 2CUSize is used.

In another example, the parameter k is derived according to eq (2) with a=0, n=3, c=1 and m=3. A concatenation of the truncated Rice binarization process and the k-th order Exp-Golomb binarization process is then used.

Figure 3:
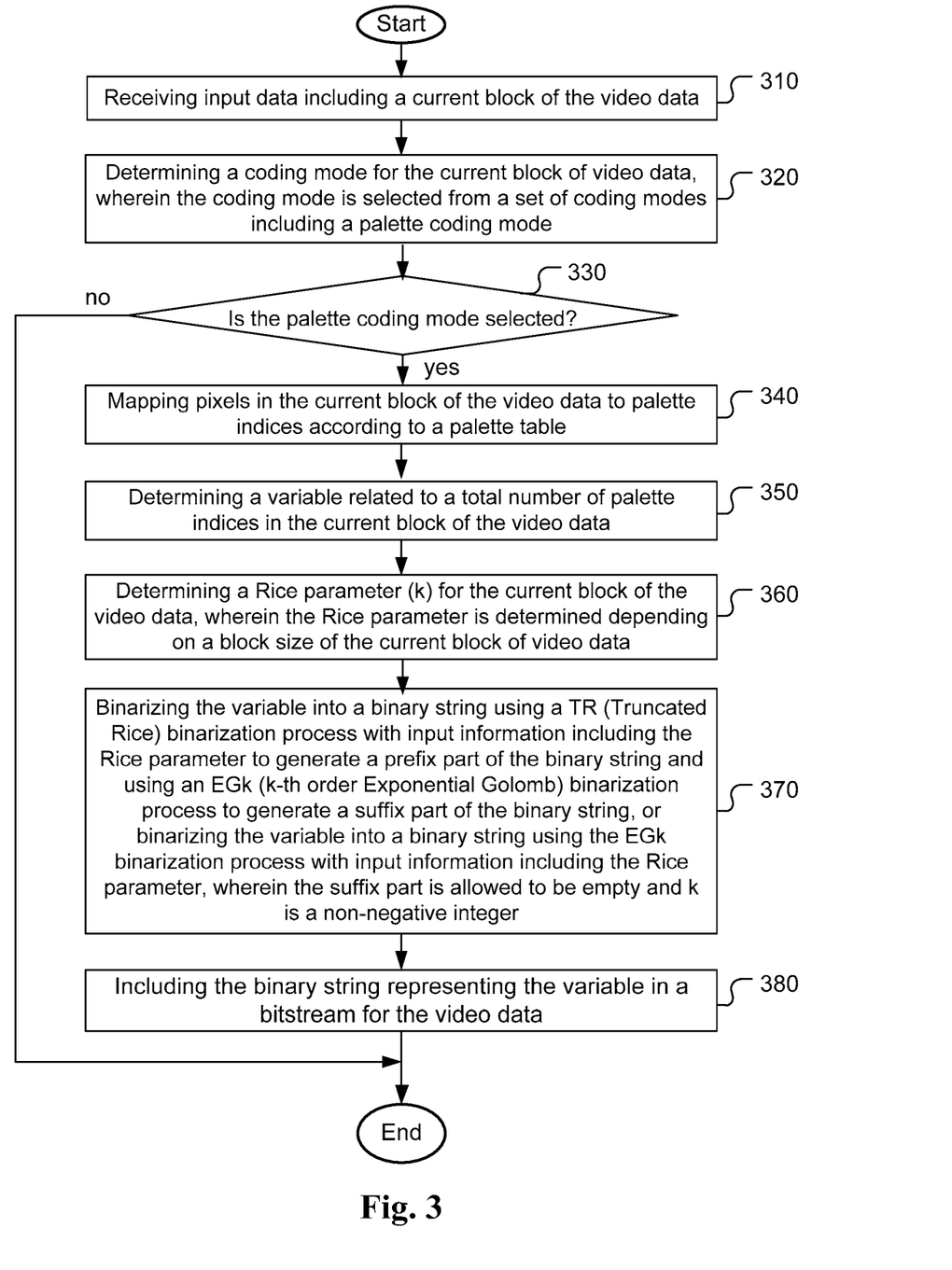
FIG. 3 illustrates an exemplary flowchart of a video encoding system using coding modes including the palette coding mode according to an embodiment of the present invention, where the number of palette indices of a block is binarized using a Rice binarization process with a Rice parameter to generate the prefix part and the Rice parameter is determined depending on the block size of the block.

FIG. 3 illustrates an exemplary flowchart of a video encoding system using coding modes including the palette coding mode according to an embodiment of the present invention, where the number of palette indices of a block is binarized using a Rice binarization process with a Rice parameter to generate the prefix part and the Rice parameter is determined depending on the block size of the block. According to this embodiment, the system receives input data including a current block of video data in step 310. As known in the field of video coding, the system may divide the image being coded into blocks such as coding units, prediction units or macroblocks. The system may receive the input data from memory such as DRAM (Dynamic Random Access Memory) or from a processor that prepares the image data in a desired format. The system determines a coding mode for the current block of video data in step 320, where the coding mode is selected from a set of coding modes including a palette coding mode. As known in modern video coding systems, the coding system often uses multiple coding modes, such as Inter mode, Intra mode, etc. and selects a best mode from the set of available coding modes for an underlying image unit. The rate-distortion optimization process may be a well-known process for selecting a best mode. A test regarding whether the palette coding mode is selected for the current block of video data is performed in step 330. If the palette coding mode is selected (i.e., the "yes" path from step 330), steps 340 through steps 380 are performed. If the palette coding mode is not selected (i.e., the "no" path from step 330), steps 340 through steps 380 are skipped. In step 340, the pixels in the current block of video data are mapped to palette indices according to a palette table. In step 350, a variable related to the total number of palette indices in the current block of video data is determined. For example, the variable may represent the total number of palette indices in the current block or the total number of palette indices in the current block minus 1. In step 360, a Rice parameter is determined for the current block of video data, where the Rice parameter is determined depending on a block size of the current block of video data. For example, the Rice parameter may include a term representing log-base-2 of the block size or scaled log-base-2 of the block size. Compared to a conventional approach being disclosed in the draft HEVC SCC standard (e.g. JCTVC-U1005), the Rice parameter may be unnecessarily large. The Rice parameter derived according to this embodiment will overcome this issue. In step 370, the variable is binarized into a binary string using a TR (Truncated Rice) binarization process with input information including the Rice parameter to generate a prefix part of the binary string and using an EGk (k-th order Exp-Golomb) binary process to generate a suffix part of the binary string, or binarizing the variable into a binary string using the EGk binarization process with input information including the Rice parameter (k), where k is a non-negative integer. When the prefix-suffix representation is used, some of the output binary strings may only include the prefix part. In other words, the suffix part is allowed to be empty. In step 380, the binary string representing the variable is included in a bitstream for the video data. Since the information regarding the number of palette indices (i.e., a syntax element for the variable) for the block has to be transmitted to a decoder for decoding the block coded in the palette coding mode. As is known in the field, the number of palette indices is just part of information for the block to be included in the bitstream.

Figure 4:
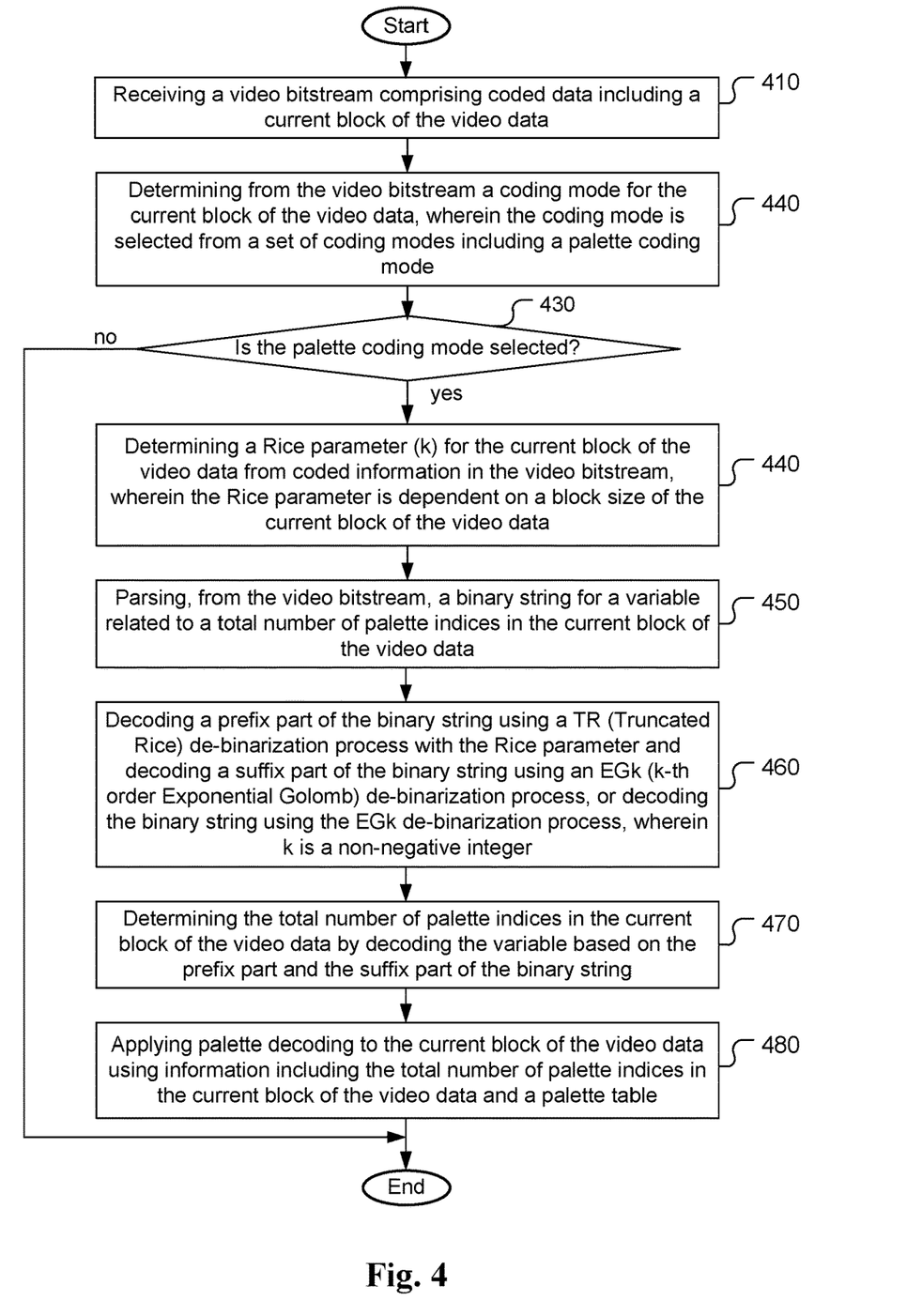
FIG. 4 illustrates an exemplary flowchart of a video decoding system using coding modes including the palette coding mode according to an embodiment of the present invention, where the number of palette indices of a block is de-binarized using a Rice binarization process with a Rice parameter to generate the prefix part and the Rice parameter is determined depending on the block size of the block.

FIG. 4 illustrates an exemplary flowchart of a video decoding system using coding modes including the palette coding mode according to an embodiment of the present invention, where the number of palette indices of a block is de-binarized using a Rice binarization process with a Rice parameter to generate the prefix part and the Rice parameter is determined depending on the block size of the block. According to this embodiment, the system receives a video bitstream comprising coded data including a current block of video data in step 410. As known in the field of video decoding, the system may retrieve the video bitstream from memory such as DRAM (Dynamic Random Access Memory) or from a processor that received the video bitstream from a channel. The decoding system determines from the video bitstream a coding mode for the current block of video data in step 420, where the coding mode is selected from a set of coding modes including a palette coding mode. A test regarding whether the palette coding mode is selected for the current block of video data is performed in step 430. If the palette coding mode is selected (i.e., the "yes" path from step 430), steps 440 through steps 480 are performed. If the palette coding mode is not selected (i.e., the "no" path from step 430), steps 440 through steps 480 are skipped. In step 440, the decoding system determines a Rice parameter for the current block of video data from coded information in the video bitstream, where the Rice parameter is dependent on a block size of the current block of video data. Usually, the Rice parameter for the current block of video data is not explicitly signalled in the bitstream. Instead, the Rice parameter is derived from other information that is already included in the bitstream. In step 450, the decoding system determines a binary string from the video bitstream for a variable related to a total number of palette indices in the current block of video data. In step 460, the decoding system decodes the prefix part of the binary string using a TR (Truncated Rice) de-binarization process with the Rice parameter and decoding a suffix part of the binary string using an EGk (k-th order Exp-Golomb) de-binarization process, or decoding the binary string using the EGk de-binarization process. In step 470, the decoding system determines the total number of palette indices in the current block of video data by decoding the variable based on the prefix part and the suffix part. In step 480, the decoding system applies palette decoding to the current block of video data using information including the total number of palette indices in the current block of video data and a palette table.

Figure 5:
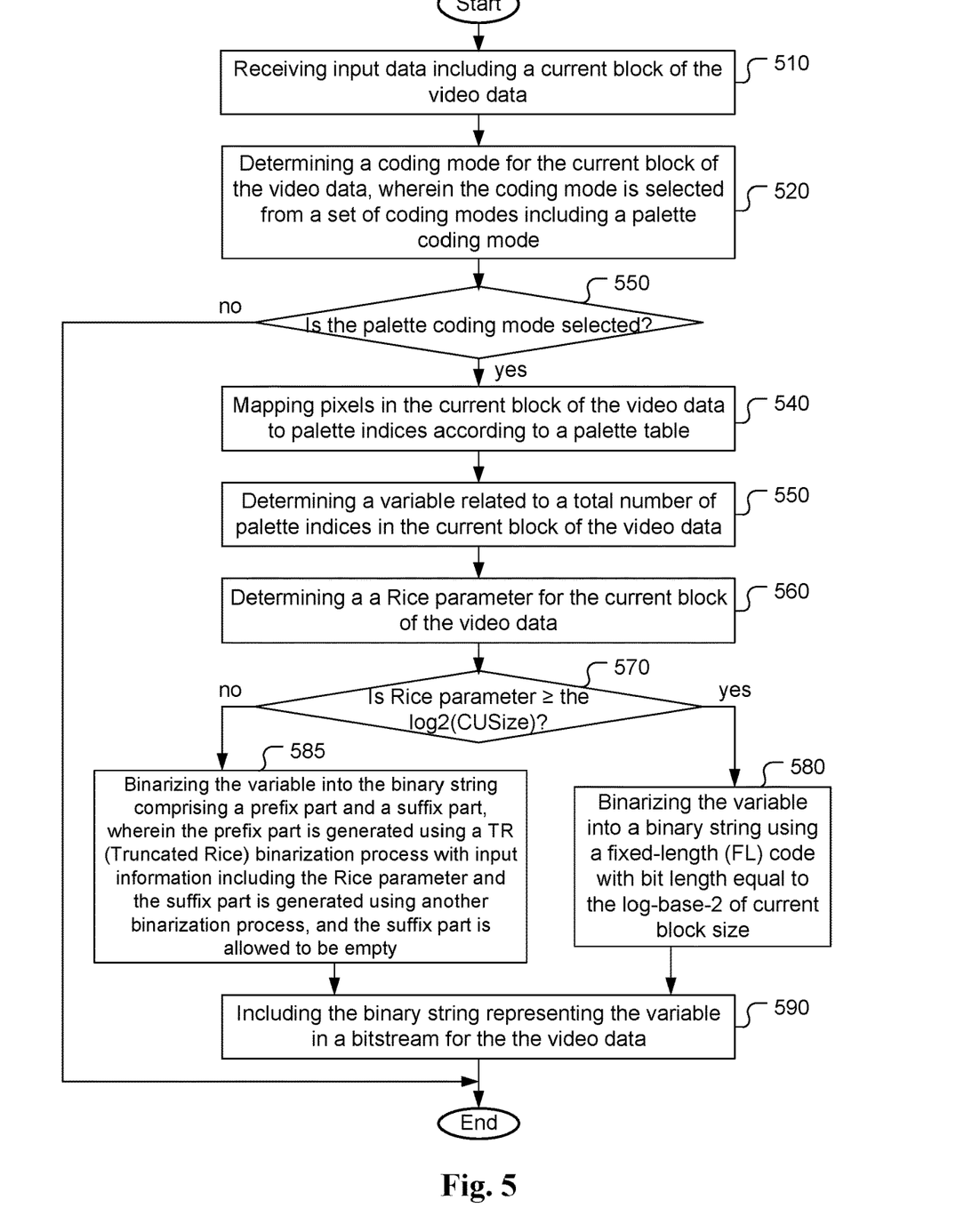
FIG. 5 illustrates an exemplary flowchart of a video encoding system using coding modes including the palette coding mode according to an embodiment of the present invention, where if the Rice parameter is greater than or equal to log-base-2 of the block size, the number of palette indices of a block is binarized using a fixed-length code, and if the Rice parameter is smaller than log-base-2 of the block size, the number of palette indices of the block is binarized using a Rice binarization process with a Rice parameter to generate the prefix part.

FIG. 5 illustrates an exemplary flowchart of a video encoding system using coding modes including the palette coding mode according to an embodiment of the present invention, where if the Rice parameter is greater than or equal to log-base-2 of the block size, the number of palette indices of a block is binarized using a fixed-length code, and if the Rice parameter is smaller than log-base-2 of the block size, the number of palette indices of the block is binarized using a Rice binarization process with a Rice parameter to generate the prefix part. According to this embodiment, the system receives input data including a current block of video data in step 510. As known in the field of video coding, the system may divide the image being coded into blocks such as coding units, prediction units or macroblocks. The system may receive the input data from memory such as DRAM (Dynamic Random Access Memory) or from a processor that prepares the image data in a desired format. The system determines a coding mode for the current block of video data in step 520, where the coding mode is selected from a set of coding modes including a palette coding mode. A test regarding whether the palette coding mode is selected for the current block of video data is performed in step 530. If the palette coding mode is selected (i.e., the "yes" path from step 530), steps 540 through steps 590 are performed. If the palette coding mode is not selected (i.e., the "no" path from step 530), steps 540 through steps 590 are skipped. In step 540, the pixels in the current block of video data are mapped to palette indices according to a palette table. In step 550, a variable related to the total number of palette indices in the current block of video data is determined. In step 560, a Rice parameter is determined for the current block of video data. In step 570, whether the Rice parameter is equal to or greater than log-base-2 of current block size (i.e., log 2(CUSize)) is checked. If the Rice parameter is equal to or greater than log-base-2 of current block size (i.e., the "yes" path from step 570), the variable is binarized into a binary string using a fixed-length (FL) code with bit length equal to the log-base-2 of current block size as shown in step 580. If the Rice parameter is smaller than log-base-2 of current block size (i.e., the "no" path from step 570), the variable is binarized into the binary string comprising a prefix part and a suffix part in step 585, where the prefix part is generated using a TR (Truncated Rice) binarization process with input information including the Rice parameter and the suffix part is generated using another binarization process, and the suffix part is allowed to be empty. In step 590, the binary string representing the variable is included in a bitstream for the video data.

Figure 6:
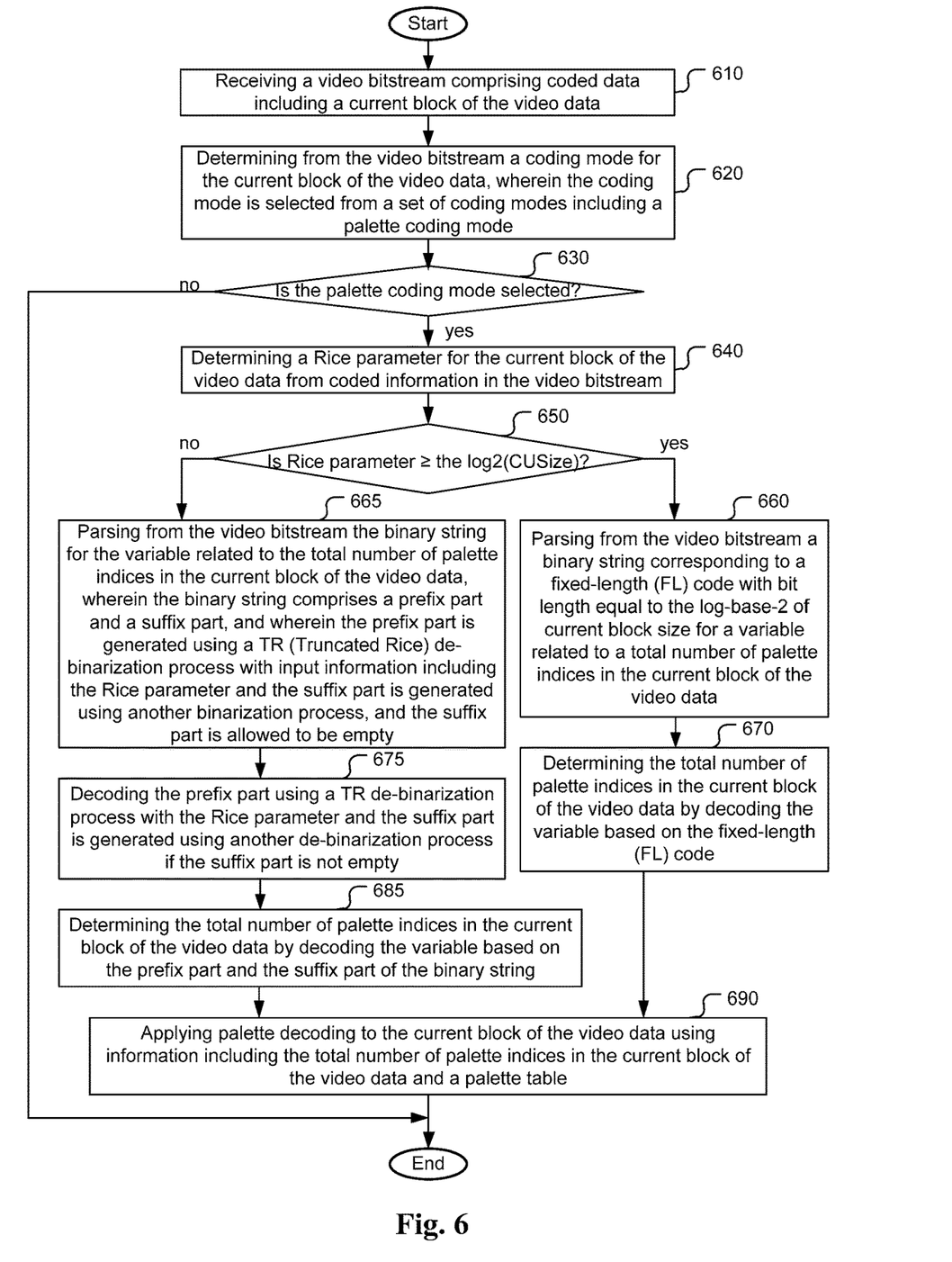
FIG. 6 illustrates an exemplary flowchart of a video decoding system using coding modes including the palette coding mode according to an embodiment of the present invention, where if the Rice parameter is greater than or equal to log-base-2 of the block size, the number of palette indices of a block is de-binarized using a fixed-length code, and if the Rice parameter is smaller than log-base-2 of the block size, the number of palette indices of the block is de-binarized using a Rice binarization process with a Rice parameter to generate the prefix part.

FIG. 6 illustrates an exemplary flowchart of a video decoding system using coding modes including the palette coding mode according to an embodiment of the present invention, where if the Rice parameter is greater than or equal to log-base-2 of the block size, the number of palette indices of a block is de-binarized using a fixed-length code, and if the Rice parameter is smaller than log-base-2 of the block size, the number of palette indices of the block is de-binarized using a Rice binarization process with a Rice parameter to generate the prefix part. According to this embodiment, the system receives a video bitstream comprising coded data including a current block of video data in step 610. The decoding system determines from the video bitstream a coding mode for the current block of video data in step 620, where the coding mode is selected from a set of coding modes including a palette coding mode. A test regarding whether the palette coding mode is selected for the current block of video data is performed in step 630. If the palette coding mode is selected (i.e., the "yes" path from step 630), step 640 is performed. If the palette coding mode is not selected (i.e., the "no" path from step 630), remaining steps are skipped. In step 640, the decoding system determines a Rice parameter for the current block of video data from coded information in the video bitstream. In step 650, whether the Rice parameter is equal to or greater than log-base-2 of current block size (i.e., log 2(CUSize)) is checked. If the Rice parameter is equal to or greater than log-base-2 of current block size (i.e., the "yes" path from step 650), steps 660 and 670 are performed. If the Rice parameter is smaller than log-base-2 of current block size (i.e., the "no" path from step 650), steps 665, 675 and 695 are performed. In step 660, a binary string parsing is parsed from the video bitstream for a variable related to a total number of palette indices in the current block of video data, where the binary string corresponds to a fixed-length (FL) code with bit length equal to the log-base-2 of current block size. In step 670, the total number of palette indices in the current block of video data is determined by decoding the variable based on the fixed-length (FL) code. In step 665, the binary string for the variable related to the total number of palette indices in the current block of video data is parsed from the video bitstream, where the binary string comprises a prefix part and a suffix part, and the prefix part is generated using a TR (Truncated Rice) de-binarization process with input information including the Rice parameter and the suffix part is generated using another binarization process, and the suffix part is allowed to be empty. In step 675, the prefix part is decoded using a Rice de-binarization process with the Rice parameter and the suffix part is decoded using another de-binarization process if the suffix part is not empty. In step 685, the total number of palette indices in the current block of video data is determined by decoding the variable based on the prefix part and the suffix part. In step 690, palette decoding is applied to the current block of video data using information including the total number of palette indices in the current block of video data and a palette table.

The flowcharts shown are intended to illustrate examples of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

What is claimed is:

1. A method of encoding video data for a video encoding system, the method comprising:
    receiving input data including a current block of the video data;
    determining a coding mode for the current block of the video data, wherein the coding mode is selected from a set of coding modes including a palette coding mode;
    if the palette coding mode is selected for the current block of the video data:
    mapping pixels in the current block of the video data to palette indices according to a palette table;
    determining a variable related to a total number of palette indices in the current block of the video data;
    determining a Rice parameter (k) for the current block of the video data;
    if the Rice parameter is equal to or greater than log-base-2 of current block size, binarizing the variable into a binary string using a fixed-length (FL) code with bit length equal to the log-base-2 of current block size;
    if the Rice parameter is smaller than the log-base-2 of current block size, binarizing the variable into the binary string comprising a prefix part and a suffix part, wherein the prefix part is generated using a TR (Truncated Rice) binarization process with input information including the Rice parameter and the suffix part is generated using another binarization process, and the suffix part is allowed to be empty; and
    including the binary string representing the variable in a bitstream for the video data.

2. The method of claim 1, wherein the current block of video data corresponds to a coding unit (CU).

3. The method of claim 1, wherein said another binarization process uses a kth-order Exponential Golomb (EGk) code, wherein k is a non-negative integer.

4. The method of claim 1, wherein a value of the Rice parameter is dependent on a block size of the current block of the video data.

5. The method of claim 4, wherein the Rice parameter, cRiceParam, for the current block of the video data is derived according to cRiceParam=(a*(log 2(CUSize)>>1)+n+((MaxPaletteIndex+c)>>m)), and wherein log 2(CUSize) is the log-base-2 of current block size, log 2( ) is a log-base-2 function, CUSize corresponds to the block size of the current block of the video data, MaxPaletteIndex specifies a maximum possible value for any palette index in the current block of the video data, and a, n, c and m are integers.

6. The method of claim 4, wherein the Rice parameter, cRiceParam, for the current block of the video data is derived according to cRiceParam=(a*(log 2(CUSize)>>1)+Floor(Log 2(MaxPaletteIndex+1))+1+n), and wherein log 2(CUSize) is the log-base-2 of current block size, log 2( ) is a log-base-2 function, Floor( ) is a floor function, CUSize corresponds to the block size of the current block of the video data, MaxPaletteIndex specifies a maximum possible value for any palette index in the current block of the video data, and a and n integers.

7. An apparatus for encoding video data in a video encoding system, the apparatus comprising one or more electronic circuits or processors arranged to:
    receive input data including a current block of the video data;
    determine a coding mode for the current block of the video data, wherein the coding mode is selected from a set of coding modes including a palette coding mode;
    if the palette coding mode is selected for the current block of the video data:
    map pixels in the current block of the video data to palette indices according to a palette table;
    determine a variable related to a total number of palette indices in the current block of the video data;
    determine a Rice parameter (k) for the current block of the video data;
    if the Rice parameter is equal to or greater than log-base-2 of current block size, binarizing the variable into a binary string using a fixed-length (FL) code with bit length equal to the log-base-2 of current block size;
    if the Rice parameter is smaller than the log-base-2 of current block size, binarize the variable into the binary string comprising a prefix part and a suffix part, wherein the prefix part is generated using a TR (Truncated Rice) binarization process with input information including the Rice parameter and the suffix part is generated using another binarization process, and the suffix part is allowed to be empty; and
    include the binary string representing the variable in a bitstream for the video data.

8. A method of decoding video data for a video decoding system, the method comprising:
    receiving a video bitstream comprising coded data including a current block of video data;
    determining from the video bitstream a coding mode for the current block of the video data, wherein the coding mode is selected from a set of coding modes including a palette coding mode;
    if the palette coding mode is used for the current block of the video data:
    determining a Rice parameter from coded information in the video bitstream;
    if the Rice parameter is equal to or greater than log-base-2 of current block size:

parsing from the video bitstream a binary string corresponding to a fixed-length (FL) code with bit length equal to the log-base-2 of current block size for a variable related to a total number of palette indices in the current block of the video data; and determining the total number of palette indices in the current block of video data by decoding the variable based on the fixed-length (FL) code; and if the Rice parameter is smaller than the log-base-2 of current block size:

parsing from the video bitstream the binary string for the variable related to the total number of palette indices in the current block of the video data, wherein the binary string comprises a prefix part and a suffix part, and wherein the prefix part is generated using a TR (Truncated Rice) binarization process with input information including the Rice parameter and the suffix part is generated using another binarization process, and the suffix part is allowed to be empty; and decoding the prefix part using a Truncated Rice de-binarization process with the Rice parameter and the suffix part is decoded using another de-binarization process if the suffix part is not empty; and determining the total number of palette indices in the current block of the video data by decoding the variable based on the prefix part and the suffix part of the binary string; and applying palette decoding to the current block of the video data using information including the total number of palette indices in the current block of the video data and a palette table.

9. The method of claim 8, wherein said another binarization process uses a kth-order Exponential Golomb (EGk) code, wherein k is a non-negative integer.

10. The method of claim 8, wherein the Rice parameter is dependent on a block size of the current block of the video data.

11. The method of claim 8, wherein a value of the Rice parameter is dependent on a block size of the current block of the video data.

12. The method of claim 11, wherein the Rice parameter, cRiceParam, for the current block of the video data is derived according to cRiceParam=(a*(log 2(CUSize)>>1)+n+((MaxPaletteIndex+c)>>m)), and wherein log 2(CUSize) is the log-base-2 of current block size, log 2( ) is a log-base-2 function, CUSize corresponds to the block size of the current block of the video data, MaxPaletteIndex specifies a maximum possible value for any palette index in the current block of the video data, a is a non-zero integer, and n, c and m are integers.

13. The method of claim 11, wherein the Rice parameter, cRiceParam, for the current block of the video data is derived according to cRiceParam=(a*(log 2(CUSize)>>1)+Floor(Log 2(MaxPaletteIndex+1))+1+n), and wherein log 2(CUSize) is the log-base-2 of current block size, log 2( ) is a log-base-2 function, Floor( ) is a floor function, CUSize corresponds to the block size of the current block of the video data, MaxPaletteIndex specifies a maximum possible value for any palette index in the current block of the video data, a is a non-zero integer, and n is an integer.

14. An apparatus for encoding video data in a video encoding system, the apparatus comprising one or more electronic circuits or processors arranged to:

receive a video bitstream comprising coded data including a current block of the video data;

determine from the video bitstream a coding mode for the current block of the video data, wherein the coding mode is selected from a set of coding modes including a palette coding mode;

if the palette coding mode is used for the current block of the video data:

determine a Rice parameter (k) from coded information in the video bitstream, wherein value of the Rice parameter is dependent on a size of the current block of the video data;

if the Rice parameter is equal to or greater than log-base-2 of current block size:

parse from the video bitstream a binary string corresponding to a fixed-length (FL) code with bit length equal to the log-base-2 of current block size for a variable related to a total number of palette indices in the current block of the video data; and determine the total number of palette indices in the current block of video data by decoding the variable based on the fixed-length (FL) code; and if the Rice parameter is smaller than the log-base-2 of current block size:

parse from the video bitstream the binary string for the variable related to the total number of palette indices in the current block of the video data, wherein the binary string comprises a prefix part and a suffix part, and wherein the prefix part is generated using a TR (Truncated Rice) binarization process with input information including the Rice parameter and the suffix part is generated using another binarization process, and the suffix part is allowed to be empty; and decode the prefix part using a Truncated Rice de-binarization process with the Rice parameter and the suffix part is decoded using another de-binarization process if the suffix part is not empty; and determine the total number of palette indices in the current block of the video data by decoding the variable based on the prefix part and the suffix part of the binary string; and apply palette decoding to the current block of the video data using information including the total number of palette indices in the current block of the video data and a palette table.

* * * * *